US012208995B2

(12) United States Patent
Burger et al.

(10) Patent No.: US 12,208,995 B2
(45) Date of Patent: Jan. 28, 2025

(54) ACTIVE COMPENSATION SYSTEM, INTENDED TO COMPENSATE AT LEAST PARTIALLY FOR THE EFFECT OF A WAVE MOTION ON A LOAD

(71) Applicant: REEL, Saint-Cyr-au-Mont-d'or (FR)

(72) Inventors: Bart Burger, Nieuw-Vennep (NL); Samuel Moriniere, Saint Sauveur d'aunis (FR); Karamoko Konate, Saint Rogatien (FR)

(73) Assignee: REEL, Saint-Cyr-au-Mont-d'Or (FR)

( * ) Notice: Subject to any disclaimer, the term of this patent is extended or adjusted under 35 U.S.C. 154(b) by 261 days.

(21) Appl. No.: 17/889,224

(22) Filed: Aug. 16, 2022

(65) Prior Publication Data

US 2023/0057910 A1 Feb. 23, 2023

(30) Foreign Application Priority Data

Aug. 17, 2021 (FR) ...................................... 2108733

(51) Int. Cl.
*B66C 13/02* (2006.01)
*B66C 23/52* (2006.01)
*B66D 1/52* (2006.01)

(52) U.S. Cl.
CPC .............. *B66C 13/02* (2013.01); *B66C 23/52* (2013.01); *B66D 1/525* (2013.01)

(58) Field of Classification Search
CPC ....... B66C 13/02; B66C 13/105; B66C 13/22; B66C 23/52; B66D 1/525
See application file for complete search history.

(56) References Cited

U.S. PATENT DOCUMENTS 8,499,708 B2 * 8/2013 Roodenburg ........... B63B 27/30 114/124
2014/0008155 A1 * 1/2014 Rossignol ............... B66B 1/302 187/290
2020/0299108 A1 * 9/2020 Van Veluw ............. B66C 13/02

FOREIGN PATENT DOCUMENTS

| | | |
|---|---|---|
| EP | 2268537 A2 | 1/2011 |
| WO | 2008/059884 | 5/2008 |
| WO | 2009/120062 | 10/2009 |
| WO | 2009120066 A2 | 10/2009 |

OTHER PUBLICATIONS

Search Report for FR Application No. 2108733 dated May 3, 2022, 2 pages.

* cited by examiner

*Primary Examiner* — Sang K Kim
*Assistant Examiner* — Nathaniel L Adams
(74) *Attorney, Agent, or Firm* — NIXON & VANDERHYE

(57) ABSTRACT

Disclosed is an active compensation system, intended to compensate at least partially for the effect of an undulating movement on a load, advantageously in a vertical direction, preferably for the active compensation of the swell. The active compensation system includes: —an electrical supply electrically connected to electrical storage unit; —electrical energy dissipating unit; and —a controller for discharging the electrical storage unit during a first phase of the undulating movement, to participate in the electrical supply of the electrical motor in addition to the power supply, and to recharge the electrical storage via the electrical supply during a second phase of the undulating movement.

12 Claims, 2 Drawing Sheets

ACTIVE COMPENSATION SYSTEM, INTENDED TO COMPENSATE AT LEAST PARTIALLY FOR THE EFFECT OF A WAVE MOTION ON A LOAD

CROSS-REFERENCE TO RELATED APPLICATIONS

This application claims priority to FR Patent Application No. 2108733 filed Aug. 17, 2021, the entire contents of which are hereby incorporated by reference.

TECHNICAL FIELD OF THE INVENTION

The present invention relates to the technical field of active compensation systems, intended to compensate at least partially for the effect of an undulating movement on a load, advantageously in a vertical direction, preferably for the active compensation of the swell.

STATE OF THE ART

Active swell compensation, also known as "active heave compensation", is a function generally used in lifting applications which aims to compensate for the movement of the ship in relation to the movement of a load.

Active heave compensation systems are traditionally hydraulically operated.

In such a hydraulic solution, the necessary power is amortized by integrating an accumulator into the hydraulic network of the lifting device. The accumulator is then able to provide the necessary increase in power and to absorb most of the energy that is returned.

But the hydraulic solutions are no longer in line with the dynamics of reducing the environmental impact which results in the electrification of the equipment, including for the active compensation of the swell.

But this "electrical" approach to active heave compensation leads to a higher power demand on the ship, with large variations in this demand (load drop).

To limit the power required on the ship and to balance the demand, one solution is to equip the electrical system with electrical energy storage.

Thus, when lifting the load, when the required power is greater than the nominal maximum, the electrical energy storage distributes the power.

But this approach then poses problems during the lowering phase of the load:

- it is necessary to manage the electrical energy returned by the motors, and
- there is always a significant variation in the demand for electrical energy, in particular due to the significant reduction in the demand for electrical power during this descent phase.

More generally, it is always advantageous to have new active compensation systems which are adapted to at least partially compensate for the effect of an undulating movement on a load, generally in a vertical direction.

PRESENTATION OF THE INVENTION

In order to remedy the aforementioned drawback of the state of the art, the present invention proposes an active compensation system, intended to compensate at least partially for the effect of an undulating movement on a load, advantageously in a vertical direction, preferably for active heave compensation.

More particularly, the invention relates to an active compensation system which comprises:

- electrical motor means, suitable for maneuvering said load during a first phase of said undulating movement, preferably a lifting phase during which said load is lifted from a low position to a high position,
- electrical power supply means, electrically connected to the electrical motor means, for electrically powering said electrical motor means,
- electrical storage means, electrically connected to the electrical motor means, to complete the electrical supply of said electrical motor means during said first phase of the undulating movement,
- control means, intended to control said active compensation system.

And, according to the invention, said electrical supply means are also electrically connected to the electrical storage means, to electrically power said electrical storage means.

The active compensation system further comprises electrical energy dissipating means which are electrically connected to the electrical motor means so as to convert, into calorific energy, the electrical energy produced by said electrical motor means during a second phase of said undulating movement, preferably a descent phase during which said load descends from said high position to said low position.

The control means comprise a control module designed to:

- discharge said electrical storage means during said first phase of the undulating movement, to participate in the electrical supply of said electrical motor means in addition to said electrical supply means, and
- recharge said electrical storage means via said electrical supply means, during said second phase of the undulating movement.

In the technical solution according to the invention, the charging of the electrical storage means is carried out by the electrical supply means.

This technical solution according to the invention has various advantages:

- the power required for the electrical power supply means is reduced during the first phase of the undulating movement, by limiting the peaks thanks to the electrical storage means, and
- the power required for the electrical power supply means is balanced: when the power requirement of the electrical motor means is not maximum (in particular during the second phase of the undulating movement), the charging power for the electrical storage means keeps the power demand stable,
- the electrical energy restored by the electrical motor means during the second phase of said undulating movement is taken over by the electrical energy dissipating means (without being stored in the electrical storage means).

Other non-limiting and advantageous characteristics of the product in accordance with the invention, taken individually or according to all the technically possible combinations, are the following:

- the electrical energy restored by the electrical motor means during the second phase of said undulating movement is taken over by the electrical energy dissipating means, without being stored in the electrical storage means;

the electrical storage means are chosen from at least one capacitor, one supercapacitor, one battery or one motor/generator with flywheel;

the electrical energy dissipating means consist of brake resistor means (chopper/brake resistor);

the electrical power supply means consist of electrical power supply means of a craft;

the control means comprise a voltage measuring device, intended to measure a voltage value of the electrical power supply means, a comparison module, intended to compare said measured voltage value with a low threshold voltage value and with a high threshold voltage value, and the control module adapted to discharge said electrical storage means when the measured voltage value is lower than the low threshold voltage value and to recharge said electrical storage means when the measured voltage value is higher than said high threshold voltage value;

the electrical storage means are electrically connected, in parallel, between said electrical power supply means and said electrical motor means;

the power supply means are electrically connected to the electrical storage means via rectifier means and DC/DC converter means;

the power supply means are electrically connected to the motor means via bidirectional or unidirectional rectifier means and inverter means;

the electrical storage means are electrically connected to the electrical motor means via unidirectional DC/DC converter means;

the electrical energy dissipating means are electrically connected to the electrical motor means via unidirectional DC/DC converter means.

The present invention also relates to a craft equipped with an active compensation system according to the invention.

The present invention also relates to the method of active compensation within a craft according to the invention, intended to compensate at least partially for the effect of an undulating movement on a load, advantageously in a vertical direction, preferably for the active compensation of the swell.

The method comprises successive cycles comprising two steps:

a first step, corresponding to a first phase of the undulating movement, preferably a lifting phase during which said load is lifted from a low position to a high position, during which said electrical storage means are discharged to participate in the electrical power supply of said electrical motor means in addition to said electrical power supply means, and a second step, corresponding to a second phase of the undulating movement, preferably a descent phase during which said load descends from a high position to a low position, during which the electrical storage means are recharged by said electrical power supply means and the energy produced by the electrical motor means is converted into heat energy by said electrical energy dissipating means.

Of course, the different characteristics, variants and embodiments of the invention can be associated with each other in various combinations insofar as they are not incompatible or exclusive of each other.

DETAILED DESCRIPTION OF THE INVENTION

In addition, various other characteristics of the invention emerge from the appended description made with reference to the drawings which illustrate non-limiting forms of embodiment of the invention and where:

It should be noted that, in these figures, the structural and/or functional elements common to the different variants may have the same references.

The present invention thus relates to an active compensation system 1 which is intended to compensate at least partially for the effect of an undulating movement on a load C, preferably in a vertical direction or possibly in at least one other direction (for example at least a horizontal direction).

In general, such a mobile load C is conventionally maneuvered in a vertical direction, between two positions: a low position and a high position.

And, as part of a movement according to a vertical direction, the undulating movement comprises two phases:

a lifting phase, during which the load C is lifted from the low position to the high position, and a descent phase, during which the load C descends from the high position to the low position.

The active compensation system 1 according to the invention is preferably suitable for active swell compensation (also called “active heave compensation”).

The load C can then be submerged or partially submerged.

Such an active heave compensation can be provided for any type of load C, for example a load to be transported by a crane G or other lifting installation (FIG. 2), a construction submerged under water such as equipment for laying pipes, etc.

Figure 2:
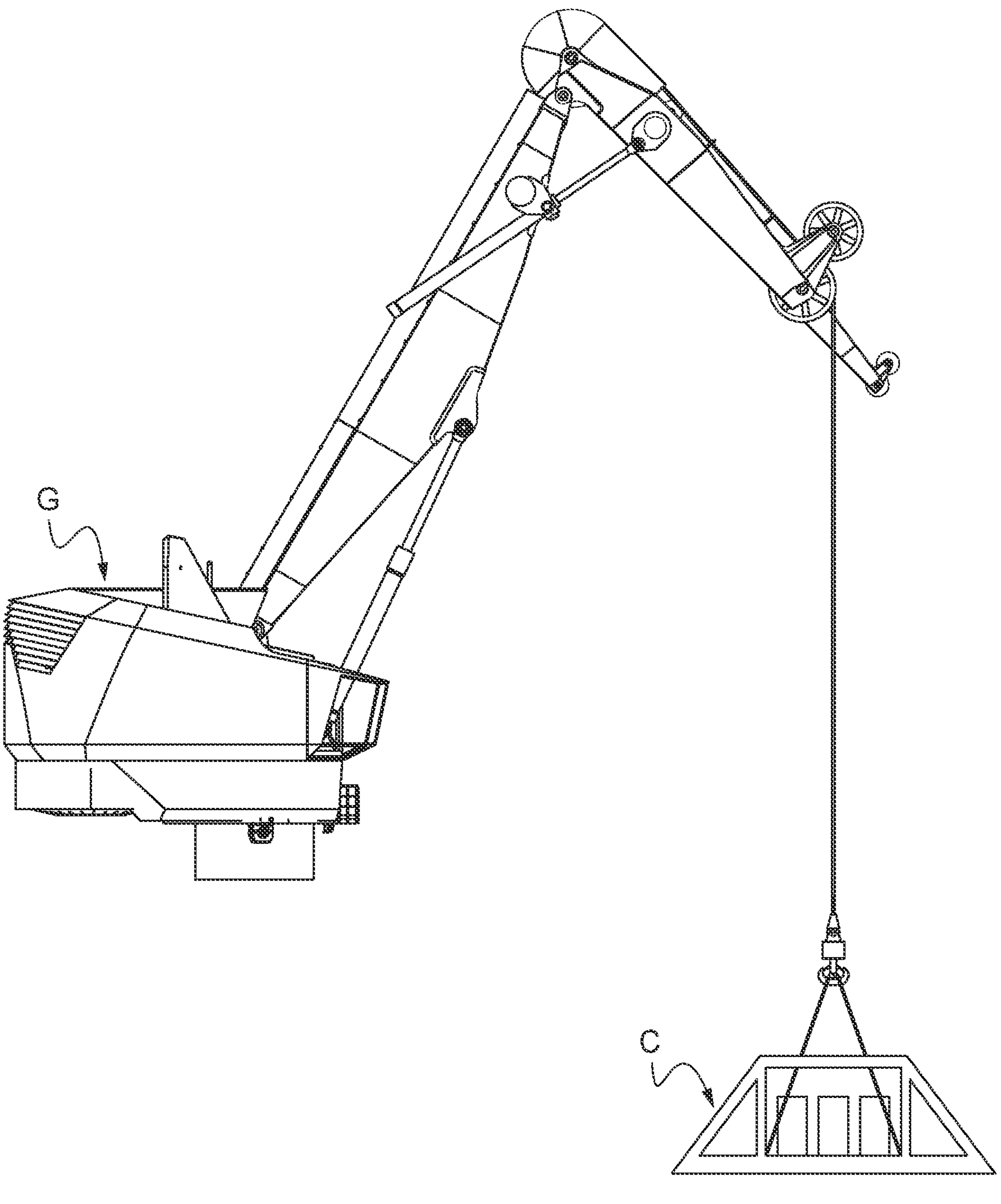
FIG. 2 is a schematic view which illustrates an apparatus that can be equipped with an active compensation system according to the invention.

In general, the active compensation system 1 according to the invention makes it possible in particular to optimize the electrical power demand in a lifting device G (FIG. 2). It is thus applicable to any peak demand for the electrical power of a lifting device G.

The active compensation system 1 according to the invention is also applicable to any device exhibiting demand peaks for electrical power due to an undulating movement on a load, in particular for the active compensation of the swell.

Such an active compensation system 1 is in particular intended to equip a craft which advantageously includes a lifting device G or a horizontal position compensation device.

The term “craft” encompasses in particular seaborne craft (not shown), in particular pipeline laying boats or laying boats for wind turbine mono-base support (also called “monopile”).

The term “hoisting device” encompasses in particular a winch, a jib of a lifting device G (for example by raising and lowering the jib and/or by modifying a length of the latter).

Figure 1:
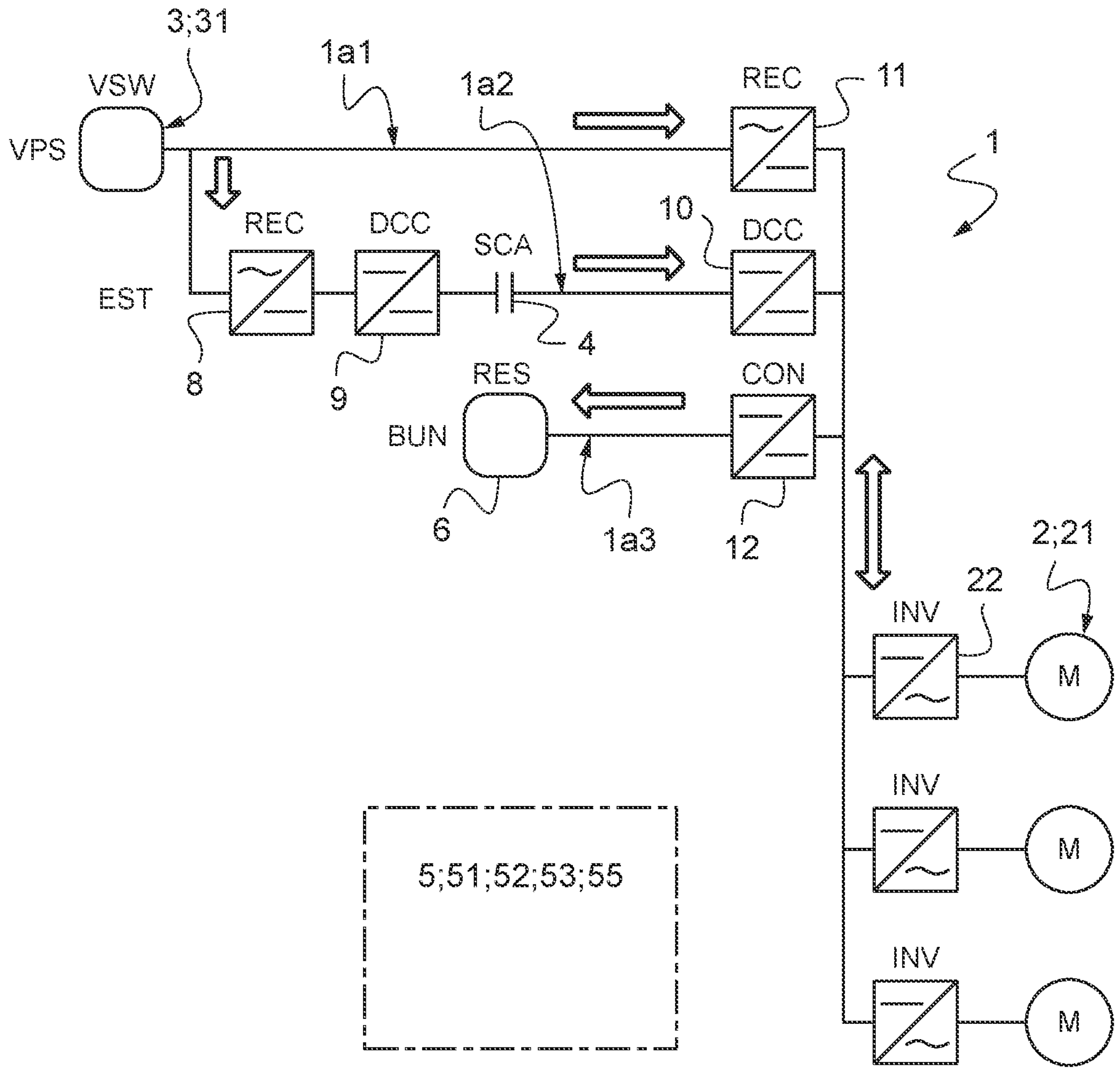
FIG. 1 is a schematic view which illustrates the active compensation system according to the invention.

The active compensation system 1 according to the invention advantageously consists of an active electrical compensation system 1 which advantageously comprises an electrical circuit 1*a* equipped with the various electrical components described below in relation to FIG. 1.

According to the invention, the active compensation system 1 comprises:

electrical motor means 2, suitable for maneuvering the load during a first phase A of the undulating movement, preferably the lifting phase, electrical power supply means 3, electrically connected to the electrical motor means 2, to electrically power these electrical motor means 2, electrical storage means 4, electrically connected to the electrical motor means 2, to complete the electrical power supply of the electrical motor means 2 during the first phase A of the undulating movement, and control means 5, intended to control the active compensation system 1.

And, according to the invention, the electrical supply means 3 are also electrically connected to the electrical storage means 4, to electrically power these electrical storage means 4.

In general, the electrical storage means 4 are thus intended to be charged by the electrical supply means 3.

During a first phase of the undulating movement, the power required on the DC bus is greater than the nominal maximum; the electrical storage means 4 distribute the electrical power to complete the electrical power supply of the electrical motor means 2 during the first phase A of the undulating movement.

Conversely, the electrical storage means 4 are charged during the period when the required power is less than the maximum, thus further reducing the electrical power demand fluctuation.

Still according to the invention, the active compensation system 1 also comprises electrical energy dissipating means 6 which are electrically connected to the electrical motor means 2 so as to convert, into calorific energy, the electrical energy produced by the electrical motor means 2 during a second phase B of the undulating movement, preferably the descent phase.

The characteristics of the active compensation system 1 according to the invention are further described in more detail below.

In general, the relative arrangement of the components on the electrical circuit 1*a* is further described by the terms "upstream"/"downstream" taking into account the relative arrangement with respect to the electrical supply means 3.

Electrical Power Supply Means

The electrical power supply means 3 advantageously consist of an alternating current generator or alternator.

The electrical supply means 3 preferably consist of electrical supply means 3 of the craft equipped with the active compensation system 1.

In this case, the electrical supply means 3 are also called "Vessel Power Supply" or VPS.

The electrical power supply means 3 are advantageously electrically connected to the electrical motor means 2 via rectifier means 11 (REC), preferably bidirectional or unidirectional.

The rectifier means 11 create a direct voltage from an alternating or direct electrical current, obtained from a switchboard 31 of the craft (also called VSW or "vessel switch board").

When the craft accepts the return of electrical energy to the electrical network, the rectifier means 11 are advantageously bidirectional; otherwise the rectifier means 11 are advantageously unidirectional.

In this case, the rectifier means 11 are advantageously mounted on a main branch 1*a*1 (or main electrical line) of the electrical circuit 1*a*.

The electrical power supply means 3, and where applicable the rectifier means 11, advantageously form a "main power supply" module, also called "Vessel Power Supply" (VPS).

Medium Electrical Motors

The electrical motor means 2 advantageously comprise at least two electrical motors 21, connected in parallel to the electrical circuit 1*a*.

An electrical motor 21 advantageously consists of an electrical motor-generator:

during the first phase A of the undulating movement, the electrical motor means 21 provide a motor function driving the load in a first vertical direction, and during the second phase B of the undulating movement, the energy is restored and the electrical motor means 21 provide an electrical generator function.

The electrical motor means 2 are advantageously electrically connected to the electrical circuit 1*a* via inverter means 22.

The electrical motor means 2 advantageously equip a lifting device, or any other maneuvering device, carried by the craft.

Electrical Storage Means

The electrical storage means 4 are also called "storage capacity" or SCA.

The electrical storage means 4 advantageously limit the electrical power required by the electrical supply means 3 and balance the load.

The electrical storage means 4 are advantageously chosen from at least one capacitor, one supercapacitor, one battery or one motor/generator with a flywheel.

The electrical storage means 4 can comprise several capacitors, supercapacitors, batteries or motors/generators with a flywheel, connected in series, connected in parallel, or any combination thereof.

The dimensioning of the electrical storage means 4 is adapted to the needs of the active compensation system 1. The electrical storage means 4 can be dimensioned according to the characteristics of the movements of the mobile load (speed, amplitude, etc.), advantageously according to a vertical direction.

The electrical storage means 4 are advantageously connected electrically, in parallel, between the electrical power supply means 3 and the electrical motor means 2.

In other words, the electrical storage means 4 are advantageously mounted in parallel or in branch, on a secondary branch 1*a*2 of the electrical circuit 1*a*.

Still in other words, the electrical storage means 4 are advantageously connected electrically, in parallel, to the electrical supply means 3 to supply the electrical motor means 2.

The electrical circuit 1*a* advantageously comprises at least two branches:

the main branch 1*a*1, advantageously comprising the rectifier means 11, and the secondary branch 1*a*2, advantageously comprising the electrical storage means 4.

The secondary branch 1*a*2 advantageously constitutes an energy storage module or "energy storage" (EST).

The charging and discharging of the electrical storage means 4 are advantageously bidirectional, depending on the demand on the bus (DC voltage level), not specifically dedicated to a function.

The electrical storage means 4 are used to balance the energy requirement, optimize energy efficiency and reduce demand peaks on the electrical network.

The electrical supply means 3 are preferably electrically connected to the electrical storage means 4 via:

rectifier means 8, and

DC/DC converter means 9 (also called "DC-DC Converter" or DCC), upstream (at the input) of the electrical storage means 4.

The rectifier means 8, conventional as such and also called AC/DC converter, are intended to supply the electrical storage means 4 with a direct current from the electrical supply means 3 supplying an alternating current.

The converter means 9, upstream, are adapted to ensure a conversion of the supply voltage to an appropriate charging voltage of the electrical storage means 4.

The electrical storage means 4 are thus advantageously connected with the electrical power supply means 3 via own rectifier means 8.

The distribution of electrical energy from the electrical supply means 3 to the electrical storage means 4 is advantageously based on this combination of rectifier means 8 and DC/DC converter means 9.

The rectifier means 8 and the DC/DC converter means 9 can be separate modules or the two functions can be integrated into a single module.

The rectifier means 8 and the converter means 9 are advantageously located on the secondary branch 1*a*2 of the electrical circuit 1*a*, upstream of the electrical storage means 4.

The rectifier means 8 and the DC/DC converter means 9 are advantageously connected in series, upstream of the electrical storage means 4 (with successively the rectifier means 8, the DC/DC converter means 9 and the electrical storage means 4).

The electrical storage means 4 are advantageously electrically connected to the electrical motor means 2 via unidirectional DC/DC converter means 10 (direction of current flow from the electrical storage means 4 to the electrical motor means 2).

The unidirectional DC/DC converter means 10 are advantageously located on the secondary branch 1*a*2 of the electrical circuit 1*a*, downstream of the electrical storage means 4.

The unidirectional DC/DC converter means 10, downstream, are adapted to ensure a conversion of the supply voltage from the electrical storage means 4 to an appropriate voltage of the electrical motor means 2.

Means for Dissipating Electrical Energy

Generally, and preferably, the electrical energy dissipating means 6 advantageously absorb overvoltages and secure the common DC bus in case of failure or overload of the electrical storage means 4 during the charging phase.

The electrical energy dissipating means 6 advantageously consist of braking resistor means (also called "chopper/brake resistor"), also called "resistor" or RES.

The electrical energy dissipating means 6 are electrically connected to the electrical circuit 1*a* via unidirectional converter means 12 (preferably DC-DC or DC-AC).

The unidirectional converter means 12 are also called "converter" or CON.

The unidirectional converter means 12 are adapted to ensure a conversion of the supply voltage coming from the electrical motor means 2 to a voltage appropriate to the electrical energy dissipating means 6 (direction of the current from the electrical motor means 2 to the dissipating means of electrical energy 6).

The electrical energy dissipating means 6 and the unidirectional converter means 12 are advantageously installed, in series, on a tertiary branch 1*a*3 of the electrical circuit 1*a*.

The electrical energy dissipating means 6 and, if necessary, the unidirectional converter means 12, form an electrical braking module, also called a "braking unit" (BUN).

Control Means

Generally, the control means 5 advantageously comprise a control module 51 designed to:

- discharge the electrical storage means 4 during the first phase A of the undulating movement, to participate in the electrical power supply of the electrical motor means 2 in addition to the electrical power supply means 3, and
- recharge the electrical storage means 4 via the electrical supply means 3 during the second phase B of the undulating movement.

For this, the control means 5 advantageously comprise:

- a voltage measuring device 52, intended to measure a voltage value of the electrical power supply means 3,
- a comparison module 53, intended to compare the measured voltage value with a low threshold voltage value and with a high threshold voltage value, and
- said control module 51, designed to discharge the electrical storage means 4 when the measured voltage value is lower than the low threshold voltage value and to recharge the electrical storage means 4 when the measured voltage value is higher than the high threshold voltage value.

Generally, the control means 5 also advantageously comprise an active compensation module 55 which is designed to control the electrical motor means 2 taking into account data coming from a movement acquisition module (also called "MRU" for "Motion Reference Unit"), so as to stabilize the load in a vertical position.

If necessary, the active compensation module 55 is thus structured to control the electrical motor means 2 so as to compensate for the movements of the craft caused by the waves.

Such an active compensation module 55 thus offers precise positioning of the load, making it possible to maintain this load in a constant vertical position.

According to a preferred embodiment, the active compensation module 55 comprises:

- means for collecting data from the movement acquisition module,
- processing means, to determine control instructions for the electrical motor means 2 which are suitable for stabilizing the load, and
- control means, for controlling said electrical motor means 2 taking into account said control instructions.

In practice and generally, the control means 5 comprise a computer. And the control module 51 and the active compensation module 55 comprise at least one computer program which comprises instructions which, when said computer program is executed by said computer, form the modules of said control means 5.

The control module 51 thus advantageously constitutes a computer-controlled system which makes it possible to control:

- the unloading of the electrical storage means 4 during the first phase A of the undulating movement and
- the recharging of the electrical storage means 4 via the electrical supply means 3 during the second phase B of the undulating movement.

The active compensation module 55 thus advantageously constitutes a computer-controlled system which makes it possible to maintain the position of the load (compensating for the movements caused by the waves), by using the electrical motor means 2.

Active Compensation Method

The present invention also relates to an active compensation method within a craft according to the invention.

This method is intended to compensate at least partially for the effect of an undulating movement on a load, advantageously in a vertical direction and/or optionally in at least one other direction, preferably for the active compensation of the swell.

The method according to the invention comprises successive cycles comprising two steps:

a first stage, corresponding to a first phase A of the undulating movement, preferably a lifting phase during which said load is lifted from a low position to a high position, during which said electrical storage means 4 are discharged to participate in the electrical supply of said electrical motor means 2 in addition to the electrical supply means 3, and a second stage, corresponding to a second phase B of the undulating movement, preferably a descent phase during which said load descends from a high position to a low position, during which the electrical storage means 4 are recharged by said electrical power supply means 3 and the energy produced by the electrical motor means 2 is converted into heat energy by said electrical energy dissipating means 6.

Of course, various other modifications may be made to the invention within the scope of the appended claims.

The invention claimed is:

1. Active compensation system, suitable to compensate at least partially for the effect of an undulating movement on a load, which active compensation system (1) comprises:

electrical motor means (2), suitable for maneuvering said load during a first phase (A) of said undulating movement, electrical power supply means (3), electrically connected to the electrical motor means (2), for electrically powering said electrical motor means (2), electrical storage means (4), electrically connected to the electrical motor means (2), to complete the electrical supply of said electrical motor means (2) during said first phase (A) of the undulating movement, control means (5) that controls said active compensation system (1), wherein said electrical supply means (3) are also electrically connected to the electrical storage means (4), to electrically power said electrical storage means (4), which active compensation system (1) further comprises electrical energy dissipating means (6) which are electrically connected to the electrical motor means (2), the electrical energy dissipating means (6) converting the electrical energy produced by the said electrical motor means (2) during a second phase (B) of said undulating movement into heat energy, and which control means (5) comprise a piloting module (51) designed to:

discharge said electrical storage means (4) during said first phase (A) of the undulating movement, to participate in the electrical supply of said electrical motor means (2) in addition to said electrical supply means (3), and recharge said electrical storage means (4) via said electrical supply means (3), during said second phase (B) of the undulating movement, wherein the electrical energy restored by the electrical motor means (2) during the second phase (B) of said undulating movement is taken over by the electrical energy dissipating means (6), without being stored in the electrical storage means (4), and wherein the electrical energy dissipating means (6) consist of braking resistor means.

2. The active compensation system, according to claim 1, wherein the electrical storage means (4) are chosen from among at least one capacitor, one supercapacitor, one battery or one motor/generator with flywheel.

3. The active compensation system, according to claim 1, wherein the electrical supply means (3) consist of electrical supply means (3) of a craft.

4. The active compensation system, according to claim 1, wherein the control means (5) comprise:

a voltage measuring device (52) that measures a voltage value of the electrical power supply means (3), a comparison module (53) that compares said measured voltage value with a low threshold voltage value and with a high threshold voltage value, and a control module (51), adapted to discharge said electrical storage means (4) when the measured voltage value is lower than the low threshold voltage value and to recharge said electrical storage means (4) when the value of measured voltage is greater than said high threshold voltage value.

5. The active compensation system, according to claim 1, wherein the electrical storage means (4) are electrically connected, in parallel, between the said electrical power supply means (3) and the said electrical motor means (2).

6. The active compensation system, according to claim 1, wherein the electrical supply means (3) are electrically connected to the electrical storage means (4) via:

rectifier means (8), and

DC/DC converter means (9).

7. The active compensation system, according to claim 1, wherein the electrical power supply means (3) are electrically connected to the electrical motor means (2) via:

rectifier means (11), bidirectional or unidirectional, and inverter means (22).

8. The active compensation system, according to claim 1, wherein the electrical storage means (4) are electrically connected to the electrical motor means (2) via unidirectional DC/DC converter means (10).

9. The active compensation system, according to claim 1, wherein the electrical energy dissipating means (6) are electrically connected to the electrical motor means (2) via DC/DC converter means unidirectional (12).

10. Craft equipped with an active compensation system (1) according to claim 1.

11. Method of active compensation within a craft according to claim 10 that compensates at least partially for the effect of an undulating movement on a load, which method comprises successive cycles comprising two steps:

a first stage, corresponding to the first phase (A) of the undulating movement, during which said storage means (4) are discharged to participate in the electrical supply of said electrical motor means (2) in addition to said electrical supply means (3), and a second stage, corresponding to the second phase (B) of the undulating movement, during which the electrical storage means (4) are recharged by said electrical power supply means (3) and the energy produced by the electrical motor means (2) is converted into heat energy by said electrical energy dissipating means (6).

12. The method of active compensation, according to claim 11, wherein the electrical energy restored by the electrical motor means (2) during the second phase (B) of said undulating movement is taken over by the electrical energy dissipating means (6), without being stored in the electrical storage means (4).

* * * * *